United States Patent
Muthyala et al.

(10) Patent No.: US 10,074,123 B2
(45) Date of Patent: *Sep. 11, 2018

(54) PRESENTING AN IMAGE OF ASSEMBLED COMPONENTS

(71) Applicant: eBay Inc., San Jose, CA (US)

(72) Inventors: Ganga Muthyala, San Jose, CA (US); Belmer Perella Garcia Negrillo, San Francisco, CA (US); Gang Han, Fremont, CA (US); Sarthak Dudhara, Sunnyvale, CA (US); Rasesh H. Shah, Cupertino, CA (US); Hema Budaraju, Cupertino, CA (US)

(73) Assignee: eBay Inc., San Jose, CA (US)

(*) Notice: Subject to any disclaimer, the term of this patent is extended or adjusted under 35 U.S.C. 154(b) by 565 days.

This patent is subject to a terminal disclaimer.

(21) Appl. No.: 14/607,000

(22) Filed: Jan. 27, 2015

(65) Prior Publication Data

US 2015/0142600 A1    May 21, 2015

Related U.S. Application Data

(63) Continuation of application No. 13/972,618, filed on Aug. 21, 2013, now Pat. No. 8,972,528, which is a
(Continued)

(51) Int. Cl.
*G06F 15/16*    (2006.01)
*G06Q 30/06*    (2012.01)
(Continued)

(52) U.S. Cl.
CPC ....... *G06Q 30/0621* (2013.01); *G06F 3/0482* (2013.01); *G06F 3/04842* (2013.01);
(Continued)

(58) Field of Classification Search
CPC ............ G06Q 30/0643; G06Q 30/0621; G06F 3/0482; G06F 3/04842; H04L 41/0876; H04L 67/16
(Continued)

(56) References Cited

U.S. PATENT DOCUMENTS

| | | |
|---|---|---|
| 5,970,471 A | 10/1999 | Hill |
| 6,083,267 A | 7/2000 | Motomiya et al. |

(Continued)

FOREIGN PATENT DOCUMENTS

| | | |
|---|---|---|
| WO | WO-0193156 A1 | 12/2001 |

OTHER PUBLICATIONS

"U.S. Appl. No. 12/635,633, Final Office Action dated Mar. 14, 2013", 8 pgs.
(Continued)

*Primary Examiner* — Kristie Shingles
(74) *Attorney, Agent, or Firm* — Schwegman Lundberg & Woessner, P.A.

(57) ABSTRACT

A ring design machine receives one or more selections of gemstones and one or more selections of settings and allows a user to "mix and match" gemstones and settings and view a selected gemstone in a compatible setting for that gemstone. To present the gemstone in the setting, the ring design machine presents a combination image that depicts the gemstone in the setting. The ring design machine, which may be implemented using a computer programmed by software, may present the combination image to the user in response to receiving a selection of the gemstone and a selection of the setting from the user via a network.

18 Claims, 7 Drawing Sheets

Related U.S. Application Data continuation of application No. 12/635,633, filed on Dec. 10, 2009, now Pat. No. 8,543,658.

(51) Int. Cl.
| | | |
|---|---|---|
| *G06F 3/0482* | (2013.01) | |
| *G06F 3/0484* | (2013.01) | |
| *G06T 11/60* | (2006.01) | |
| *H04L 12/24* | (2006.01) | |
| *H04L 29/08* | (2006.01) | |

(52) U.S. Cl.
CPC ..... *G06Q 30/0603* (2013.01); *G06Q 30/0643* (2013.01); *G06T 11/60* (2013.01); *H04L 41/0876* (2013.01); *H04L 67/16* (2013.01)

(58) Field of Classification Search
USPC .......................................................... 709/217
See application file for complete search history.

(56) References Cited

U.S. PATENT DOCUMENTS

| | | | | |
|---|---|---|---|---|
| 6,618,714 | B1* | 9/2003 | Abrahams | G06Q 30/02 |
| | | | | 706/45 |
| 6,795,744 | B2 | 9/2004 | Hruby | |
| 6,983,236 | B1* | 1/2006 | Karlovac | G06Q 30/0603 |
| | | | | 703/22 |
| 7,225,149 | B2 | 5/2007 | Silberstein et al. | |
| 7,266,514 | B2 | 9/2007 | Herbert et al. | |
| 7,885,862 | B1* | 2/2011 | Vincent | G06Q 30/0633 |
| | | | | 705/26.61 |
| 8,032,424 | B1 | 10/2011 | Fastenau et al. | |
| 8,209,237 | B2* | 6/2012 | Depta | G06Q 10/06 |
| | | | | 705/26.5 |
| 8,543,658 | B2* | 9/2013 | Muthyala | G06Q 30/0603 |
| | | | | 709/206 |
| 8,856,160 | B2* | 10/2014 | Beaver, III | G06T 19/00 |
| | | | | 707/758 |
| 8,972,528 | B2* | 3/2015 | Muthyala | G06Q 30/0603 |
| | | | | 709/217 |
| 2005/0261989 | A1 | 11/2005 | Vadon et al. | |
| 2006/0200816 | A1* | 9/2006 | Pramanick | G01R 31/31907 |
| | | | | 717/170 |
| 2006/0241958 | A1* | 10/2006 | Blanchard, Jr. | G06Q 20/20 |
| | | | | 705/26.1 |
| 2007/0226075 | A1* | 9/2007 | Hiroshige | G06Q 10/087 |
| | | | | 705/26.8 |
| 2009/0144174 | A1 | 6/2009 | Reddy | |
| 2011/0145335 | A1 | 6/2011 | Muthyala et al. | |
| 2013/0339178 | A1 | 12/2013 | Muthyala et al. | |

OTHER PUBLICATIONS

"U.S. Appl. No. 12/635,633, Non Final Office Action dated Aug. 30, 2012", 9 pgs.
"U.S. Appl. No. 12/635,633, Notice of Allowance dated May 24, 2013", 10 pgs.
"U.S. Appl. No. 12/635,633, Response filed Apr. 29, 2013 to Final Office Action dated Mar. 14, 2013", 14 pgs.
"U.S. Appl. No. 12/635,633, Response filed Nov. 12, 2012 to Non Final Office Action dated Aug. 30, 2012", 12 pgs.
"U.S. Appl. No. 13/972,618, Non Final Office Action dated Jun. 25, 2014", 7 pgs.
"U.S. Appl. No. 13/972,618, Notice of Allowance dated Oct. 16, 2014", 9 pgs.
"U.S. Appl. No. 13/972,618, Preliminary Amendment filed Aug. 26, 2013", 9 pgs.
"U.S. Appl. No. 13/972,618, Response filed Sep. 25, 2014 to Non Final Office Action dated Jun. 25, 2014", 10 pgs.
U.S. Appl. No. 12/635,633 U.S. Pat. No. 8,543,658, filed Dec. 10, 2009, Presenting a Gemstone in a Setting.
U.S. Appl. No. 13/972,618, filed Aug. 21, 2013, Presenting an Image of Assembled Components.

\* cited by examiner

Ring Designer    330 — [ NEXT ]

Search for Gemstones

310

Select gemstone criteria

Shape

Price Range

Carat

Color

Clarity

Cut

320

Search Results

| | Gem | Shape | Carat | Color | Clarity | Cut | Price |
|---|---|---|---|---|---|---|---|
| ☒ | Diamond | Oval | 0.50 | M | VS1 | Good | $257 |
| ☒ | Diamond | Princess | 0.52 | M | I2 | Good | $265 |
| ☐ | Diamond | Marquise | 0.38 | M | SI2 | Good | $270 |
| ☒ | Diamond | Marquise | 0.37 | M | I1 | Fair | $274 |

*FIG. 3*

Ring Designer

Design your ring

Choose a selected gemstone

[ Diamond Oval ▼ ]
510

530

Color: M
Clarity: VS1
Cut: Good $257

Choose a selected setting

[ Elegant, Yellow ▼ ]
520

540

＋

Style: Solitaire
Metal: Yellow Gold $230

Preview your ring

550

＝

Click here to
[buy this ring now]

$487

Click here to
[save this ring to wish list]
560

Click here to
[share this ring]
570

*FIG. 5*

PRESENTING AN IMAGE OF ASSEMBLED COMPONENTS

PRIORITY

This application is a continuation of U.S. patent application Ser. No. 13/972,618, filed on Aug. 21, 2013, which is a continuation of U.S. patent application Ser. No. 12/635,633, filed on Dec. 10, 2009, the benefit of priority of each of which is claimed hereby, and each are incorporated herein by reference in their entirety.

TECHNICAL FIELD

The subject matter disclosed herein generally relates to the processing of data. Specifically, the present disclosure addresses systems and methods involving a ring design machine to present a gemstone in a setting.

BACKGROUND

It is known that a machine may be used to facilitate a presentation of a product for selection by a user. A web server machine may cause an electronic storefront to be displayed to the user. For example, the web server machine may transmit data to a web client machine of the user, and the web client machine may use the data to present the electronic storefront to the user. The electronic storefront may present an available product. If the user is interested in the product, the user may use the electronic storefront to select that product for purchase or to obtain further information about the product.

BRIEF DESCRIPTION OF THE DRAWINGS

Some embodiments are illustrated by way of example and not limitation in the figures of the accompanying drawings in which:

FIG. 3 is a diagram illustrating a graphical window with a gemstone search interface, according to some example embodiments;

FIG. 5 is a diagram illustrating a graphical window with a combination image, according to some example embodiments;

DETAILED DESCRIPTION

Figure 1:
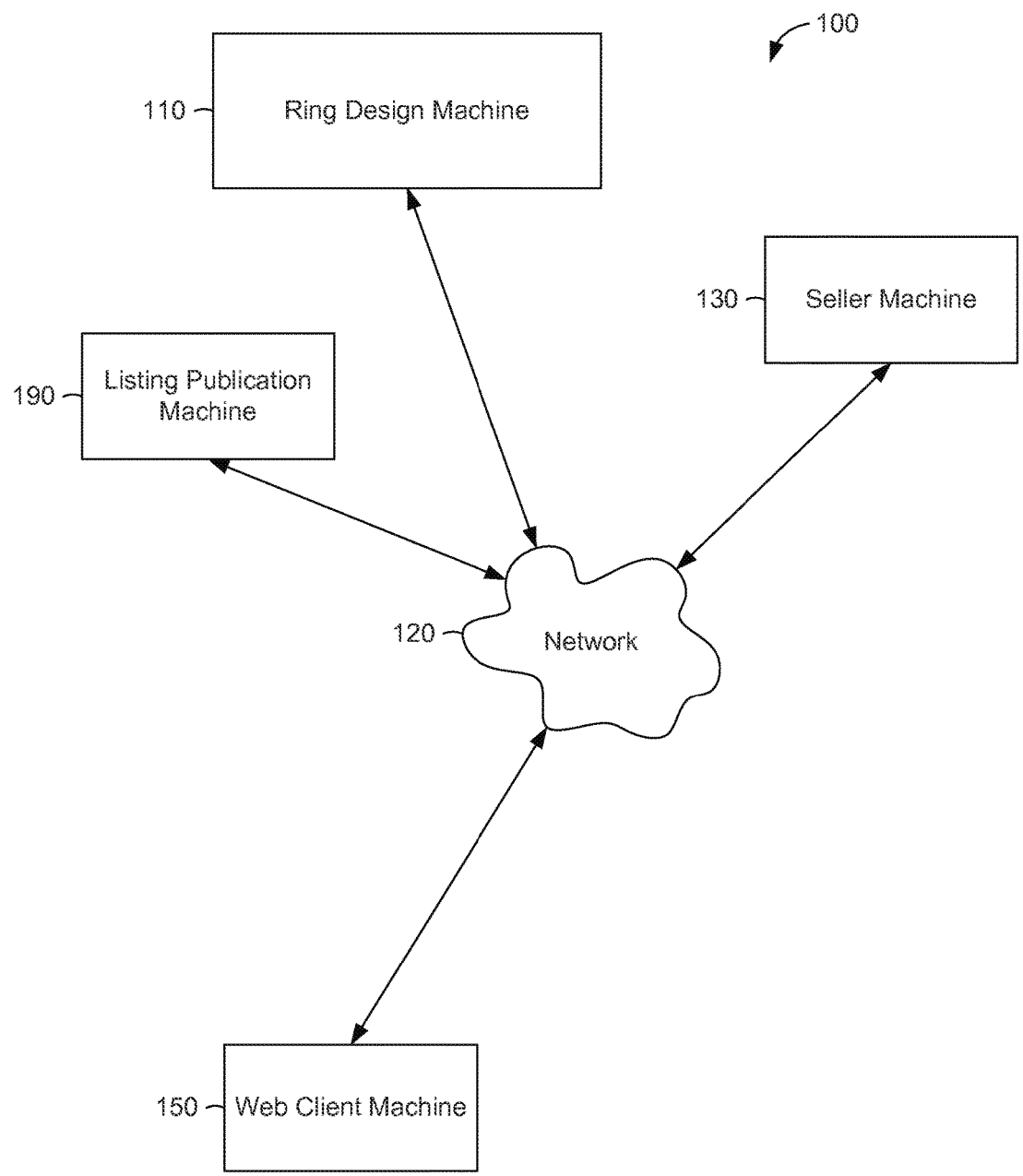
FIG. 1 is a network diagram illustrating a system including a ring design machine, according to some example embodiments.

Example methods and systems are directed to presenting a gemstone in a setting. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

According to some example embodiments, a ring design machine receives one or more selections of gemstones and one or more selections of settings and allows a user to "mix and match" gemstones and settings and view a selected gemstone in a compatible setting for that gemstone. To present the gemstone in the setting, the ring design machine presents a combination image that depicts the gemstone in the setting. The ring design machine, which may be implemented using a computer programmed by software, may present the combination image to the user in response to receiving a selection of the gemstone and a selection of the setting from the user via a network.

The ring design machine, in certain example embodiments, receives a gemstone image that depicts the gemstone without the setting, receives a setting image that depicts the setting without the gemstone, and receives the combination image depicting the gemstone in the setting. These images may be received via the network from a seller machine associated with a seller of the gemstone, the setting, or both. The ring design machine may also receive gemstone listings and setting listings. For example, some or all of these listings may be received via the network from a listing publication machine that publishes listings of available gemstones, settings, or both. The ring design machine may further receive compatibility information usable to determine which settings are compatible with a particular gemstone. For example, some or all of the compatibility information may be received via the network from the seller machine, the listing publication machine, or both.

In various example embodiments, the ring design machine determines a set of gemstones from which the user may make a selection. The ring design machine may determine the set of gemstones based on user-generated gemstone criteria. For example, the ring design machine may provide a search engine to search the gemstone listings. The user-generated gemstone criteria may include a gemstone shape indicator, a gemstone price indicator, a gemstone size indicator, a gemstone color indicator, a gemstone clarity indicator, a gemstone cut indicator, or any suitable combination thereof. According to various example embodiments, the ring design machine determines a set of settings from which the user may make a selection. The ring design machine may determine the set of settings based on the one or more selected gemstones, the compatibility information, user-generated setting criteria, or any suitable combination thereof. The user-generated setting criteria may include a setting style indicator, a setting metal indicator, or any suitable combination thereof.

The ring design machine, according to some example embodiments, presents gemstone listings to the user and prompts the user to make a selection from the gemstone listings. For example, the ring design machine may cause a web client machine of the user to display the gemstone listings and prompt the user to select a gemstone listing, thus selecting the gemstone represented by the gemstone listing. The ring design machine may receive the selection of the gemstone via the network from the web client machine. Multiple selections of gemstones may be similarly received.

The ring design machine, according to certain example embodiments, determines whether a particular setting is compatible with a particular gemstone. For example, the ring design machine may determine that the setting is compatible with the gemstone based on the compatibility information. The ring design machine presents setting listings to the user and prompts the user to make a selection from the setting listings. For example, the ring design machine may cause the web client machine to display the setting listings and prompt the user to select a setting listing, thus selecting the setting represented by the setting listing. The ring design machine may receive the selection of the setting via the network from the web client machine. Multiple selections of settings may be similarly received.

In various example embodiments, the ring design machine presents the gemstone image, the setting image, or both to the user. This has the effect of indicating to the user what has been selected. For example, the ring design machine may cause the web client machine to display the gemstone image and the setting image to the user.

The ring design machine, according to some example embodiments, presents the combination image to the user. For example, the ring design machine may cause the web client machine to display the combination image to the user. This has the effect of presenting an image of the combination of the gemstone and the setting as a representative result of "mixing and matching" the gemstone and the setting according to the selections received from the user. In certain example embodiments, the ring design machine further presents summarizing information pertinent to the gemstone, the setting, a ring that combines the gemstone and setting, or any suitable combination thereof.

The ring design machine, in some example embodiments, maintains a data record of the user and stores wish list information in the data record. The wish list information may include the user's selection of the gemstone, the user's selection of the setting, the summarizing information, the combination image, a reference (e.g., a pointer or address) to the combination image, or any suitable combination thereof. According to certain example embodiments, the ring design machine enables one or more other users (e.g., friends or social network connections of the user) to access the wish list information. This has the effect of sharing the wish list information with the one or more other users, which may be designated by the user. The ring design machine may use the data record of the user to store social network data referencing the one or more other users.

The ring design machine, in certain example embodiments, receives a request from the user to send a message pertaining to the wish list information. Responsive to the request to send a message, the ring design machine may send the message (e.g., an email message, a voicemail message, a text message, an instant message, or a micro-blog update) to a recipient designated by the user. This has the effect of sharing the wish list information with the recipient.

FIG. 1 illustrates a system 100 involved in presenting a gemstone in a setting, according to some example embodiments. The system 100 includes a ring design machine 110, a seller machine 130, a web client machine 150, and a listing publication machine 190, all connected to a network 120 and configured to communicate with each other via the network 120. According to some example embodiments, the ring design machine 110 is implemented using a computer that has been programmed by software to perform a method of presenting a gemstone in a setting, as described below with respect to FIG. 6.

The seller machine 130 is associated with a seller of gemstones, settings, or both. The seller machine 130 may function as a source for information relating to gemstones, settings, or both.

The web client machine 150 is associated with a user. The user of the web client machine 150, in some example embodiments, may be a potential buyer of a gemstone, the setting, or both.

The listing publication machine 190 publishes listings of items available for sale (e.g., gemstones, settings, rings, etc.). The listing publication machine 190 may be a web server machine and may constitute all or part of a network-based publication system. For example, the listing publication machine 190 may be a web server machine that hosts an online store, auction website, classified advertisement website, or any suitable combination thereof. The listing publication machine 190 is configured to transmit one or more gemstone listings that respectively correspond to one or more gemstones. The listing publication machine 190 is also configured to transmit one or more setting listings that respectively correspond to one or more settings.

Any of the machine shown in FIG. 1 may be implemented in a general-purpose computer modified (e.g., programmed) by software to be a special-purpose computer to perform the functions described herein for that machine. For example, a computer system able to implement any one or more of the methodologies described herein is discussed below with respect to FIG. 7. Moreover, any two or more of the machines illustrated in FIG. 1 may be combined into a single machine, and the functions described herein for a single machine may be subdivided among multiple machines.

The network 120 may be any network that enables communication between machines (e.g., the ring design machine 110 and the web client machine 150). Accordingly, the network 120 may be a wired network, a wireless network, or any suitable combination thereof. The network 120 may include one or more portions that constitute a private network, a public network (e.g., the Internet), or any suitable combination thereof.

Figure 2:
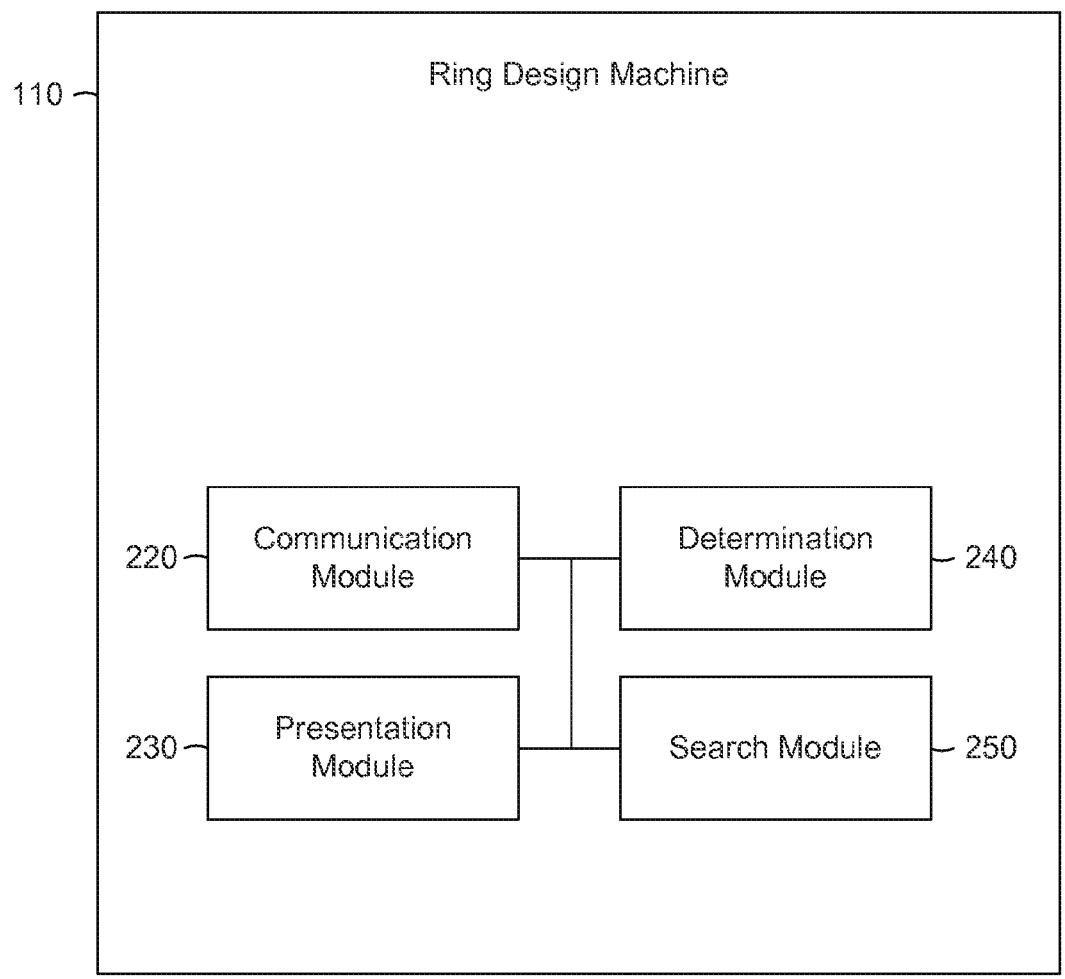
FIG. 2 is a block diagram of a ring design machine, according to some example embodiments.

FIG. 2 illustrates components of the ring design machine 110, according to some example embodiments. The ring design machine 110 includes a communication module 220, a presentation module 230, a determination module 240, and a search module 250, all configured to communicate with each other (e.g., via a bus, a shared memory, a switch, etc.). Any of these modules may be implemented using hardware, as described below with respect to FIG. 7. Moreover, any two or more of these modules may be combined into a single module, and the functions described herein for a single module may be subdivided among multiple modules.

The communication module 220, in some example embodiments, manages communications with the seller machine 130, web client machine 150, and a listing publication machine 190. The communication module 220 receives a selection (hereinafter, the "first" selection) via the network 120. For example, the first selection may be received by the communication module 220 from the web client machine 150. The first selection indicates a gemstone as selected from a set of gemstones by the user of the web client machine 150. The communication module 220 receives another selection (hereinafter the "second" selection) via the network 120. As an example, the second selection may be received by the communication module 220 from the web client machine 150. The second selection indicates a setting as selected from a set of settings by the user of the web client machine 150.

In certain example embodiments, the communication module 220 receives compatibility information via the network 120. The compatibility information is usable (e.g., by the search module 250) to determine that the selected setting is combinable with the selected gemstone.

The communication module 220, in various example embodiments, receives supplemental data to facilitate presenting a gemstone in a setting. The supplemental data may include, without limitation, a gemstone image that depicts the gemstone without the setting, a setting image that depicts the setting without the gemstone, a combination image that depicts the gemstone in the setting, one or more gemstone listings published by the listing publication machine 190, one or more setting listings published by the listing publication machine 190, or any suitable combination thereof. The communication module 220 may receive some or all of the supplemental data prior to receiving the first selection or prior to receiving the second selection via the network 120.

According to some example embodiments, the communication module 220 receives or accesses user-generated criteria for searching the listings published by the listing publication machine 190. For example, the communication module 220 may receive user-generated gemstone criteria, user-generated setting criteria, or both. As noted above, the user-generated gemstone criteria may include a gemstone shape indicator, a gemstone price indicator, a gemstone size indicator, a gemstone color indicator, a gemstone clarity indicator, a gemstone cut indicator, or any suitable combination thereof. As noted above, the user-generated setting criteria may include a setting style indicator, a setting metal indicator, or both.

The presentation module 230, in certain example embodiments, causes information to be presented to the user (e.g., via the web client machine 150 and the network 120). The presentation module 230 may present the combination image to the user of the web client machine 150. For example, the presentation module 230 may cause the web client machine 150 to initiate a display of the combination image to the user. According to various example embodiments, the presentation module 230 transmits the combination image to the web client machine 150, along with an instruction to display the combination image (e.g., in a web browser application executing on the web client machine 150).

In various example embodiments, the presentation module 230 presents to the user a set of gemstone listings, a set of setting listings, or both. The presentation module 230, according to some example embodiments, prompts the user to make a selection of a gemstone, make a selection of a setting, or any suitable combination thereof. For example, the presentation module 230 may cause the web client machine 150 to display one or more graphical windows to present listings, to prompt the user, or both. Some example embodiments of graphical windows are discussed below with respect to FIGS. 3-5.

The determination module 240, in certain example embodiments, determines whether a setting is combinable with a gemstone. This determination may be based on the compatibility information received by the communication module 220. For example, after the communication module 220 has received the first and second selections (of the gemstone and of the setting, respectively), the determination module 240 may use the compatibility information to determine that the selected setting is combinable with the selected gemstone. As another example, the determination module 240 may use the compatibility information to determine a set of settings that are combinable with a selected gemstone, where none of the settings have been selected. As a further example, where no gemstone has been selected and no setting has been selected, the determination module 240 may use the compatibility information to determine a set of settings that are combinable with any particular gemstone. A similar set of settings may be determined for each gemstone represented in the gemstone listings received by the communication module 220.

The search module 250, in various example embodiments, provides a search engine to search among the gemstone listings, the setting listings, or both. The search engine may utilize the user-generated criteria received or accessed by the communication module 220. For example, the search module 250 may determine a set of gemstone listings based on the user-generated gemstone criteria. The set of gemstone listings corresponds to a set of gemstones from which the user may make a selection of a gemstone. As another example, the search module 250 may determine a set of setting listings based on the user-generated setting criteria. The set of setting listings corresponds to a set of settings from which the user may make a selection of a setting. The search module 250 may utilize user preferences that have been generated by a human (e.g., the user), by a machine (e.g., a computer performing a data mining operation on user-generated data), or any suitable combination thereof.

FIG. 3 illustrates a graphical window 300 with a gemstone search interface 310, according to some example embodiments. The graphical window 300 may be presented to the user by the presentation module 230 (e.g., via the web client machine 150 and the network 120). The graphical window 300 includes the gemstone search interface 310, a gemstone search results interface 320, and a selection submission button 330.

The gemstone search interface 310 allows the user to select from various gemstone criteria. This has the effect of allowing the user to generate the user-generated gemstone criteria (e.g., for use by the search module 250). The gemstone criteria may include, without limitation, a gemstone shape indicator, a gemstone price indicator, a gemstone size indicator, a gemstone color indicator, a gemstone clarity indicator, a gemstone cut indicator, or any suitable combination thereof. The gemstone shape indicator may indicate, for example, "Round," "Princess," "Emerald," "Asscher," "Oval," "Radiant," "Pear," "Heart," "Marquise," or "Cushion." The gemstone price indicator may be expressed in a local currency of the user (e.g., a currency local to the web client machine 150). The gemstone size indicator may be expressed in carats. The gemstone color indicator may represent a degree of color ranging from "faint yellow" to "colorless." The gemstone clarity indicator may represent a degree of clarity ranging from "visible inclusions" to "flawless." The gemstone cut indicator may represent a degree of quality ranging from "poor" to "excellent" or "ideal." The gemstone criteria may include multiple values for any one or more indicators (e.g., a series of values, or a range of values). For example, the gemstone criteria may include a gemstone price range (e.g., a minimum price indicator and a maximum price indicator).

The gemstone search results interface 320 presents the set of gemstone listings to the user and prompts the user to select one or more gemstones represented in the set of gemstone listings. As noted above, the gemstone listings may be published by the listing publication machine 190, and one or more gemstone listings may be received by the communication module 220. Moreover, the set of gemstone listings may be determined by the search module 250 based on the user-generated gemstone criteria (e.g., generated using the gemstone search interface 310). In the example embodiments shown in FIG. 3, the user may click a checkbox to indicate a selection of a gemstone.

The selection submission button 330, when clicked by the user, operates to submit the user's gemstone selection to the ring design machine 110 (e.g., for receipt by the communication module 220). Multiple selections may be submitted with a single click on the selection submission button 330. The selection submission button 330 may be implemented using any type of user-interface element (e.g., button, hyperlink, etc.).

Figure 4:
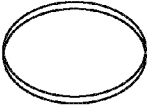
FIG. 4 is a diagram illustrating a graphical window with a setting search interface, according to some example embodiments.

FIG. 4 illustrates a graphical window 400 with a setting search interface 410, according to some example embodiments. The graphical window 400 may be presented to the user by the presentation module 230 (e.g., via the web client machine 150 and the network 120). The graphical window 400 includes the setting search interface 410, a setting search results interface 420, a gemstone selection interface 430, and a selection submission button 440.

The setting search interface 410 allows the user to select from various setting criteria. This has the effect of allowing the user to generate the user-generated setting criteria (e.g., for use by the search module 250). The setting criteria may include, without limitation, a setting style indicator, a setting metal indicator, or any suitable combination thereof. The setting style indicator may indicate, for example, "Solitaire," "Side Stones," "Engagement Set," "Designer," or "Pave." The setting metal indicator may represent a metal or metal alloy, for example, "yellow gold," "white gold," "rose gold," "14 k gold," "silver," "titanium," "pewter," or "platinum." The setting criteria may include multiple values for any one or more indicators (e.g., a series of values).

The gemstone selection interface 430 allows the user to designate a particular gemstone of the gemstones previously selected using the gemstone search results interface 320. This has the effect of allowing the determination module 240 to determine a set of settings that are combinable with the particular gemstone. Where multiple gemstones were previously selected, the designation of one particular gemstone may modify the set of setting listings displayed in the setting search results interface 420. In such cases, the gemstone selection interface 430 indicates the currently designated gemstone that corresponds to the currently displayed set of setting listings. Where a single gemstone was previously selected, the gemstone selection interface 430 simply indicates the selected gemstone.

The setting search results interface 420 presents the set of setting listings to the user and prompts the user to select one or more settings represented in the set of setting listings. As noted above, the setting listings may be published by the listing publication machine 190, and one or more setting listings may be received by the communication module 220. Moreover, the set of setting listings may be determined by the search module 250 based on the user generated setting criteria (e.g., generated using the setting search interface 410). Furthermore, the set of setting listings may be modified by the determination module to include only setting listings that are determined to be combinable with the particular gemstone currently displayed in the gemstone selection interface 430. As noted above, this determination may be based on the compatibility information received by the communication module 220. In the example embodiments shown in FIG. 4, the user may click a thumbnail image representative of the setting listing to indicate a selection of a setting.

The selection submission button 440, when clicked by the user, operates to submit the user's setting selection to the ring design machine 110 (e.g., for receipt by the communication module 220). Multiple selections may be submitted with a single click on the selection submission button 440. The selection submission button 440 may be implemented using any type of user-interface element (e.g., button, hyperlink, etc.).

FIG. 5 illustrates a graphical window 500 with a combination image 550, according to some example embodiments. The graphical window 500 may be presented to the user by the presentation module 230 (e.g., via the web client machine 150 and the network 120). The graphical window 500 includes a gemstone selection interface 510, a setting selection interface 520, a gemstone image 530, a setting image 540, the combination image 550, a storage request interface 560, and a sharing request interface 570.

The gemstone selection interface 510, according to some example embodiments, allows the user to make the first selection (of a gemstone) and to submit the first selection to the ring design machine 110 (e.g., for receipt by the communication module 220). In some example embodiments, the gemstone image 530 is displayed in the graphical window 500 as visually corresponding to the first selection. The gemstone image 530 may depict the selected gemstone without any setting.

The setting selection interface 520, according to certain example embodiments, allows a user to make the second selection (of a setting) and to submit the second selection to the ring design machine 110 (e.g., for receipt by the communication module 220). In some example embodiments, the setting image 540 is displayed in the graphical window 500 as visually corresponding to the second selection. The setting image 540 may depict the selected setting without any gemstone.

The combination image 550, in some example embodiments, is a single image that depicts the selected gemstone in the selected setting so that presenting the combination image 550 in the graphical window 500 has the effect of presenting the gemstone in the setting to the user. According to certain example embodiments, the combination image 550 is generated (e.g., by the seller machine 130) from the gemstone image 530 and the setting image 540. The graphical window 500, in various example embodiments, includes summarizing information pertinent to the gemstone, the setting, a ring that combines the gemstone and setting, or any suitable combination thereof. The summarizing information may include portions excerpted from the gemstone listings, the setting listings, or both.

The storage request interface 560, when activated by the user, operates to submit a storage request to the ring design machine 110 (e.g., to communication module 220). According to some example embodiments, the storage request constitutes a request that information related to the selected gemstone, the selected setting, the ring that combines the selected gemstone and the selected setting, or any suitable combination thereof, be stored in a wish list of the user. As noted above, the ring design machine 110 may maintain a data record of the user. Responsive to the storage request, the ring design machine 110 (e.g., communication module 220) may store wish list information in the data record. The wish list information may include, without limitation, the first selection (of the gemstone), the second selection (of the setting), the summarizing information, the combination image 550, a reference (e.g., a pointer or address) to the summarizing information or to the combination image 550, or any suitable combination thereof. The storage request interface 560 may be implemented using any type of user-interface element (e.g., button, hyperlink, etc.).

The sharing request interface 570, when activated by the user, operates to submit a sharing request to the ring design machine 110 (e.g., communication module 220). According to some example embodiments, the sharing request constitutes a request that the wish list information of the user be shared with one or more other users, one or more designated recipients, or any suitable combination thereof.

In some example embodiments, the ring design machine 110 (e.g., communication module 220), in response to the sharing request, enables the one or more other users to access the wish list information. The one or more other users may be friends or social network connections of the user (e.g., as designated by the user). The ring design machine 110 may use the data record of the user to store social network data that references the one or more other users. In some example embodiments, the ring design machine 110 may send a notification to the one or more other users (e.g., announcing that the wish list information has been shared).

In certain example embodiments, the ring design machine 110 (e.g., communication module 220), in response to the sharing request, may generate all or part of a message pertaining to the wish list information for one or more recipients designated by the user. The one or more recipients may be designated before or after submission of the sharing request. For example, the data record of the user may include identifying data of a recipient (e.g., a default recipient). As another example, the ring design machine 110 may prompt the user to designate a recipient for the particular message generated in response to the sharing request. The ring design machine 110 (e.g., communication module 220) may send the message to the designated recipient. In some example embodiments, the ring design machine 110 causes another machine (e.g., a message server machine) to send a message. The message may be an email message, a voicemail message, a text message, an instant message, a micro-blog update, or any suitable combination thereof. Furthermore, the designated recipient may be a human (e.g., an email address of a human) or a machine (e.g., a computer hosting a micro-blog service).

Figure 6:
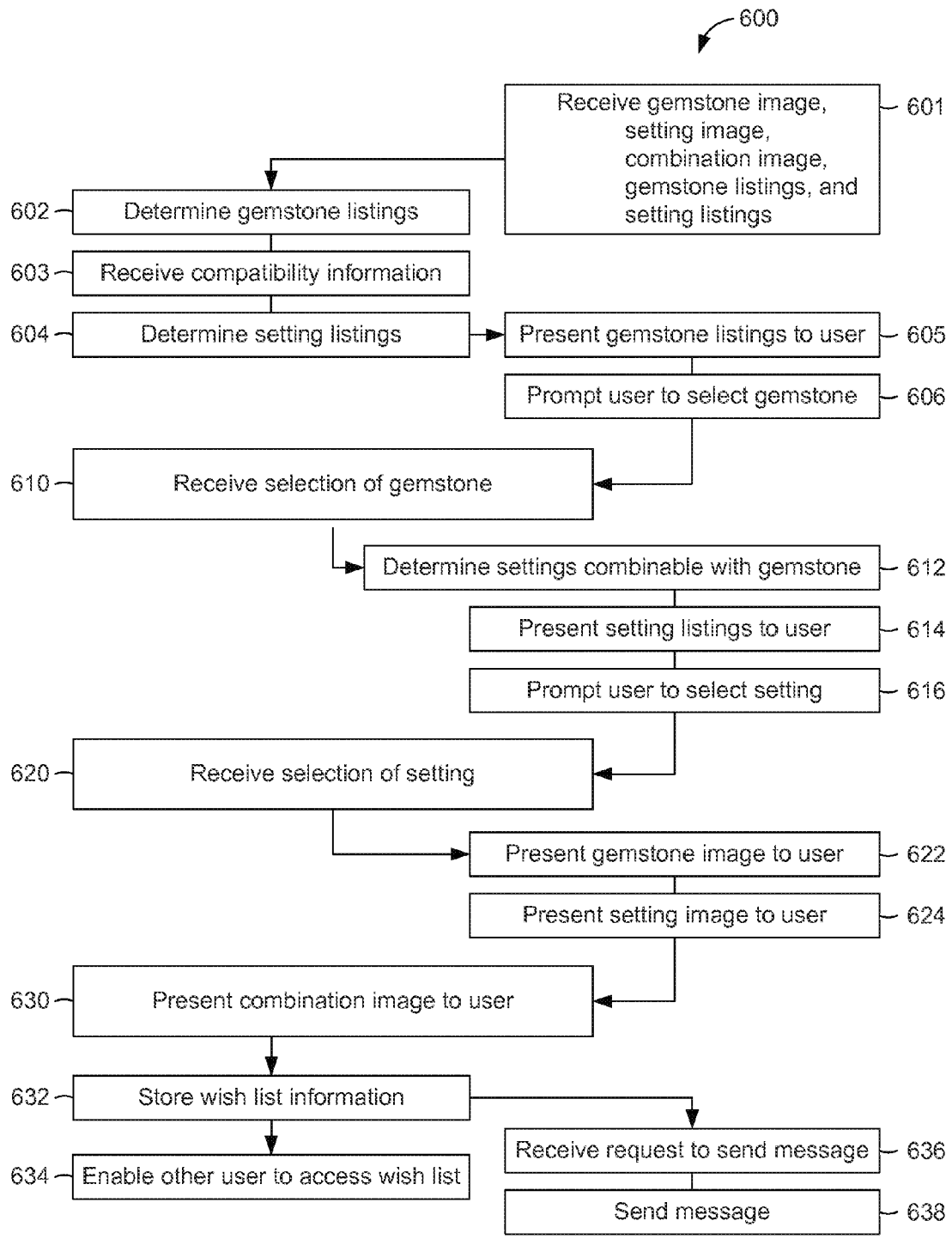
FIG. 6 is a flow chart illustrating a method of presenting a gemstone in a setting, according to some example embodiments.

FIG. 6 illustrates a method 600 of presenting a gemstone in a setting, according to some example embodiments. The method 600 includes operations 601-638, which are shown in a particular sequence, but are not limited to the sequence shown.

Operation 601 may be performed by the communication module 220 and involves receiving via the network 120 at least one of: the gemstone image 530, the setting image 540, the combination image 550, one or more gemstone listings, one or more setting listings, or any suitable combination thereof. For example, the gemstone image, the setting image, and the combination image may be received from the seller machine 130, and the gemstone listings and setting listings may be received from the listing publication machine 190. In some example embodiments, operation 601 further includes receiving or accessing user-generated gemstone criteria or user-generated setting criteria.

Operation 602 may be performed by the search module 250 and involves determining a set of gemstone listings to be presented to the user. In some example embodiments, this determination is based on the user-generated gemstone criteria.

Operation 603 may be performed by the communication module 220 and involves receiving compatibility information via the network 120. As noted above, the compatibility information is usable (e.g., by the determination module 240) to determine that a setting is combinable with the gemstone.

Operation 604 may be performed by the search module 250 and involves determining a set of setting listings to be presented to the user. In some example embodiments, this determination is based on the user-generated setting criteria.

Operations 605 and 606 may be performed by the presentation module 230. Operation 605 involves presenting the set of gemstone listings to the user. In operation 606, the presentation module 230 prompts the user to make a selection (the first selection) from the set of gemstone listings. For example, the presentation module 230 may perform operations 605 and 606 by causing the gemstone search results interface 320 to be presented to the user. In operation 610, the communication module 220 receives the first selection via the network 120 (e.g., from the web client machine 150).

Operation 612 may be performed by the determination module 240 and involves determining that one or more settings (e.g., represented in the set of setting listings) are combinable with one or more gemstones (e.g., represented in the set of gemstone listings). In some example embodiments, operation 612 may be based on the compatibility information received in operation 603. For example, the determination module 240 may determine that one or more particular settings are combinable with the gemstone corresponding to the first selection.

Operation 614 may be performed by the presentation module 230 and involves presenting the set of setting listings to the user. In operation 616, the presentation module 230 prompts the user to make a selection (the second selection) from the set of setting listings. For example, the presentation module 230 may perform operations 614-616 by causing the setting search results interface 420 to be presented to the user. In operation 620, the communication module 220 receives the second selection via the network 120 (e.g., from the web client machine 150).

Operations 622 and 624 may be performed by the presentation module 230. Operation 622 involves presenting the gemstone image 530 to the user. In operation 624, the presentation module 230 presents the setting image 540 to the user. For example, the presentation module 230 may perform operations 622 and 624 by causing a graphical window 500 that includes the gemstone image 530 and the setting image 540 to be presented to the user (e.g., via the web client machine 150 and the network 120).

Operation 630 may be performed by the presentation module 230 and involves presenting the combination image 550 to the user. For example, the presentation module may cause the graphical window 500, which includes the combination image 550, to be presented to the user (e.g., via the web client machine 150 and the network 120).

Operation 632 may be performed by the communication module 220 and involves storing the wish list information in the data record of the user. The communication module 220 may perform operation 632 in response to receiving a storage request (e.g., submitted using the storage request interface 560).

Operation 634 may be performed by the communication module 220 and involves enabling another user to access the wish list information. The communication module 220 may perform operation 634 in response to receiving a sharing request (e.g., submitted using the sharing request interface 570).

Operations 636 and 638 may be performed by the communication module 220. In operation 636, the communication module 220 receives a sharing request that constitutes a request to send a message to a recipient. In some example embodiments, the communication module 220 reads the data record of the user to access identifying data of the recipient. In certain example embodiments, the communication module 220 prompts the user to designate the recipient. In operation 638, the communication module 220 causes the message to be sent to the recipient (e.g., by the ring design machine 110, or by another machine). As noted above, the message may be an email message, a voicemail message, a text message, an instant message, a micro-blog update, or any suitable combination thereof, and the recipient may be a human (e.g., an email address of a human) or a machine (e.g., a computer hosting a micro-blog service).

In various example embodiments, one or more of the methodologies described herein may facilitate a decision-making process of the user related to potential purchase of a gemstone, a setting, a ring that combines the gemstone and the setting, or any suitable combination thereof. For example, presentation of the combination image 550 to the user may assist the user in quickly visualizing the ring that combines the gemstone and the setting, thus enabling improved decision-making with respect to the ring. Moreover, one or more of the methodologies described herein may facilitate a statistical information gathering process of the seller of the gemstone, the setting, or both. For example, statistical data on how many times the combination image 550 has been presented to various users may indicate the aesthetic appeal of, or market demand for, the ring depicted in the combination image 550 or other rings similar to it. Such statistical data may enable improved decision-making related to ring production, inventory management, gemstone marketing, or any suitable combination thereof.

Figure 7:
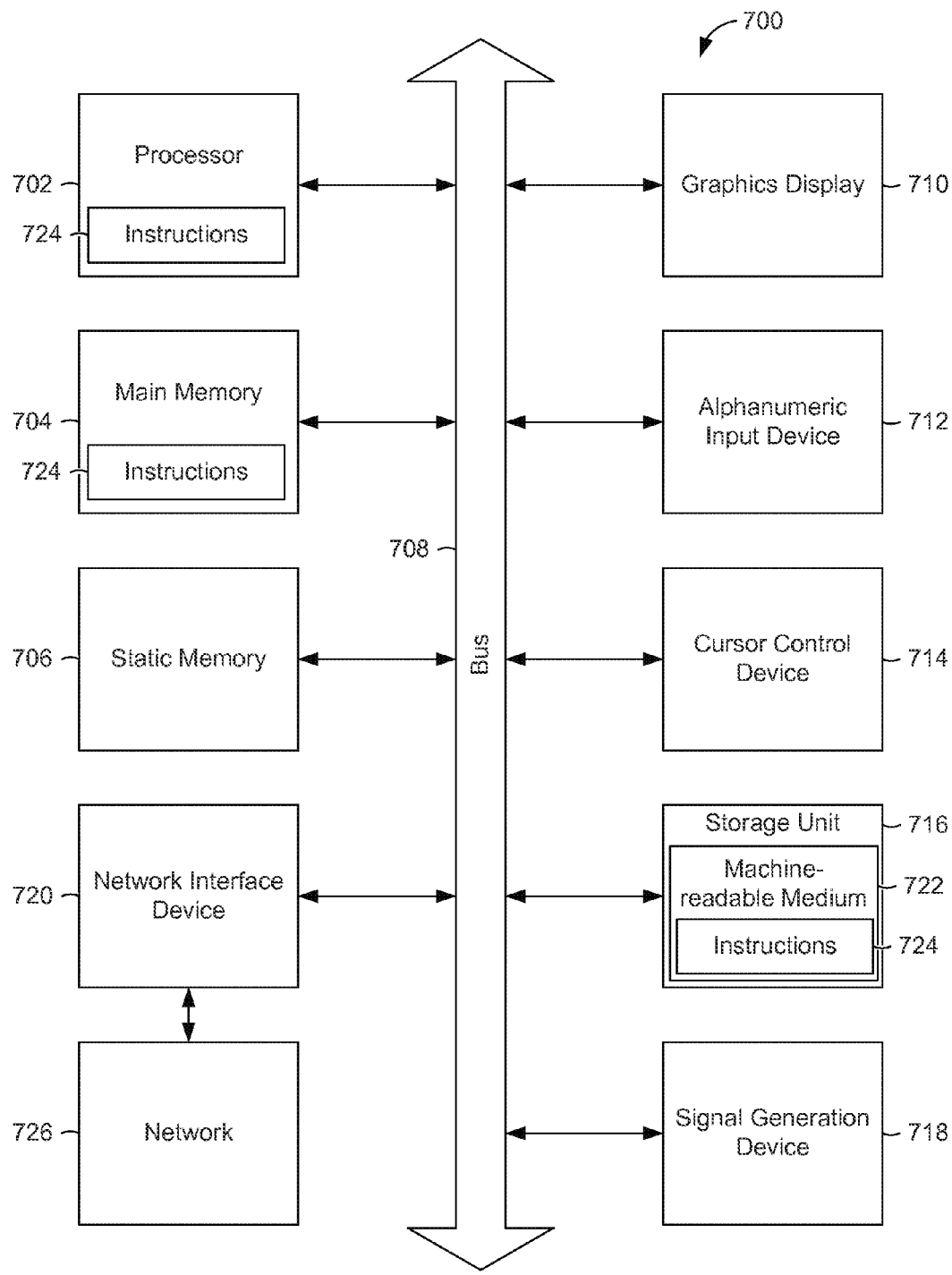
FIG. 7 is a block diagram illustrating components of a machine, according to some example embodiments, able to read instructions from a machine-readable medium and perform any one or more of the methodologies discussed herein.

FIG. 7 illustrates components of a machine 700, according to some example embodiments, that is able to read instructions from a machine-readable medium (e.g., machine-readable storage medium) and perform any one or more of the methodologies discussed herein. Specifically, FIG. 7 shows a diagrammatic representation of the machine 700 in the example form of a computer system and within which instructions 724 (e.g., software) for causing the machine 700 to perform any one or more of the methodologies discussed herein may be executed. In alternative embodiments, the machine 700 operates as a standalone device or may be connected (e.g., networked) to other machines. In a networked deployment, the machine 700 may operate in the capacity of a server machine or a client machine in a server-client network environment, or as a peer machine in a peer-to-peer (or distributed) network environment. The machine 700 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 724 (sequentially or otherwise) that specify actions to be taken by that machine. Further, while only a single machine is illustrated, the term "machine" shall also be taken to include a collection of machines that individually or jointly execute the instructions 724 to perform any one or more of the methodologies discussed herein.

The machine 700 includes a processor 702 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 704, and a static memory 706, which are configured to communicate with each other via a bus 708. The machine 700 may further include a graphics display 710 (e.g., a plasma display panel (PDP), a liquid crystal display (LCD), a projector, or a cathode ray tube (CRT)). The machine 700 may also include an alphanumeric input device 712 (e.g., a keyboard), a cursor control device 714 (e.g., a mouse, a touchpad, a trackball, a joystick, a motion sensor, or other pointing instrument), a storage unit 716, a signal generation device 718 (e.g., a speaker), and a network interface device 720.

The storage unit 716 includes a machine-readable medium 722 on which is stored the instructions 724 (e.g., software) embodying any one or more of the methodologies or functions described herein. The instructions 724 may also reside, completely or at least partially, within the main memory 704, within the processor 702 (e.g., within the processor's cache memory), or both, during execution thereof by machine 700. Accordingly, the main memory 704 and the processor 702 may be considered as machine-readable media. The instructions 724 may be transmitted or received over a network 726 (e.g., network 120) via the network interface device 720.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 722 is shown in an example embodiment to be a single medium, the term "machine-readable medium" should be taken to include a single medium or multiple media (e.g., a centralized or distributed database, or associated caches and servers) able to store instructions (e.g., instructions 724). The term "machine-readable medium" shall also be taken to include any medium that is capable of storing instructions (e.g., software) for execution by the machine, such that the instructions, when executed by one or more processors of the machine (e.g., processor 702), cause the machine to perform any one or more of the methodologies described herein. The term "machine-readable medium" shall accordingly be taken to include, but not be limited to, a data repository in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an application-specific integrated circuit (ASIC). A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals." or the like. These words, however, are merely convenient labels and are to be associated with appropriate physical quantities.

Unless specifically stated otherwise, discussions herein using words such as "processing," "computing," "calculating," "determining," "presenting." "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A computer-implemented method comprising:
receiving component criteria from a client machine of a first user;
retrieving a plurality of first components based on the component criteria;
causing display of a presentation of the plurality of first components in response to the retrieving the plurality of first components, the presentation of the plurality of first components comprising a set of images that depict each component among the plurality of first components;
receiving a first selection of an image that corresponds to a first component from among the presentation of the plurality of first components, the first component having a first component attribute and compatibility information;
causing the client machine to display a request for a second selection of a second component from among a plurality of second components in response to the receiving the first selection of the image that corresponds to the first component, the plurality of second components being compatible with the first component based on the compatibility information;
receiving, from the client machine of the user, the second selection of the second component, the second component having a second component attribute;
causing the client machine to display a combination image that depicts an assembly comprising the first component and the second component in response to the receiving the second selection of the second component, the combination image including a display of summarization information, the summarization information based on the first component attribute and the second component attribute;
receiving a storage request for the combination image from the client machine; and
storing a reference to the first component, the second component, and the combination image within a memory location associated with the user in response to the receiving the storage request.

2. The computer-implemented method of claim 1, further comprising:
presenting to the user a set of first components published by a network based publication system, the set of first components comprising the plurality of first components; and
prompting the user to make the first selection from the set of first components.

3. The computer-implemented method of claim 1, further comprising:
presenting to the user a set of second components published by a network based publication system, the set of second components comprising the plurality of second components; and
prompting the user to make the second selection from the set of second components.

4. The computer-implemented method of claim 1, further comprising:
presenting a first component image that depicts the first component independent of the second component.

5. The computer-implemented method of claim 1, further comprising:
presenting a second component image that depicts the second component independent of the first component.

6. The computer-implemented method of claim 1 further comprising:
receiving compatibility information via the network, the compatibility information being usable to determine that the first component is compatible with the second component; and
determining that the first selection and the second selection are compatible based on the compatibility information.

7. The computer-implemented method of claim 1 further comprising:
receiving via the network at least one of:
a first component image that depicts the first component independent of the second component;
a second component image that depicts the second component independent of the first component;
the combination image;
a set of first components published by a network based publication system, the set of first components comprising the plurality of first components; and
a set of second components published by a network based publication system, the set of second components comprising the plurality of second components.

8. The method of claim 1, wherein the memory location associated with a user is accessible by the user and one or more additional users specified by a user specified list of additional users.

9. The method of claim 1, further comprising:
receiving a request to transmit a message on behalf of the user to one or more additional users, the message indicating at least one of the first selection, the second selection, the combination image, or a reference to the combination image; and
transmitting the message to the one or more additional users.

10. The method of claim 1 further comprising:
receiving from the user, user-generated criteria for the first component, the user-generated criteria for the first component including first component-attribute indicators corresponding to the first plurality of components.

11. The method of claim 1 further comprising:
receiving from the user, user-generated criteria for the second component, the user-generated criteria for the second component including second component-attribute indicators corresponding to the second plurality of components.

12. A non-transitory machine-readable storage medium comprising instructions that, when executed by one or more processors of a machine, cause the machine to perform operations comprising:
receiving component criteria from a client machine of a first user;
retrieving a plurality of first components based on the component criteria;
causing display of a presentation of the plurality of first components in response to the retrieving the plurality of first components, the presentation of the plurality of first components comprising a set of images that depict each component among the plurality of first components;
receiving a first selection of an image that corresponds to a first component from among the presentation of the plurality of first components, the first component having a first component attribute and compatibility information;

causing the client machine to display a request for a second selection of a second component from among a plurality of second components in response to the receiving the first selection of the image that corresponds to the first component, the plurality of second components being compatible with the first component based on the compatibility information;

receiving, from the client machine of the user, the second selection of the second component, the second component having a second component attribute;

causing the client machine to display a combination image that depicts an assembly comprising the first component and the second component in response to the receiving the second selection of the second component, the combination image including a display of summarization information, the summarization information based on the first component attribute and the second component attribute;

receiving a storage request for the combination image from the client machine; and storing a reference to the first component, the second component, and the combination image within a memory location associated with the user in response to the receiving the storage request.

13. The non-transitory machine-readable storage medium of claim 12, wherein the operations further comprise:

presenting to the user a set of first components published by a network based publication system, the set of first components comprising the plurality of first components; and prompting the user to make the first selection from the set of first components.

14. The non-transitory machine-readable storage medium of claim 12, wherein the operations further comprise:

presenting to the user a set of second components published by a network based publication system, the set of second components comprising the plurality of second components; and prompting the user to make the second selection from the set of second components.

15. The non-transitory machine-readable storage medium of claim 12, wherein the operations further comprise:

receiving compatibility information via the network, the compatibility information being usable to determine that the first component is compatible with the second component; and determining that the first selection and the second selection are compatible based on the compatibility information.

16. A system comprising:

a communication module configured to:

receive component criteria from a client machine of a first user;

retrieve a plurality of first components based on the component criteria;

cause display of a presentation of the plurality of first components in response to the retrieving the plurality of first components, the presentation of the plurality of first components comprising a set of images that depict each component among the plurality of first components;

receive a first selection of an image that corresponds to a first component from among the presentation of the plurality of first components, the first component having a first component attribute and compatibility information;

cause the client machine to display a request for a second selection of a second component from among a plurality of second components in response to the receiving the first selection of the image that corresponds to the first component, the plurality of second components being compatible with the first component based on the compatibility information;

receive, from the client machine of the user, the second selection of the second component, the second component having a second component attribute;

a processor configured by a presentation module to cause the client machine to display a combination image that depicts an assembly comprising the first component and the second component in response to the receiving the second selection of the second component, the combination image including a display of summarization information, the summarization information based on the first component attribute and the second component attribute;

receive a storage request for the combination image from the client machine; and store a reference to the first component, the second component, and the combination image within a memory location associated with the user, in response to the storage request.

17. The system of claim 16, wherein:

the communication module is further configured to:

prompt the user to make the first selection from the set of first components; and prompt the user to make the second selection from the second set of components; and the processor is further configured by the presentation module to cause the client machine to display the combination image, the combination image comprising an assembly of the first selection and the second selection.

18. The system of claim 16, wherein:

the memory location is accessible by the user and one or more additional users, the one or more additional users identified in a list of one or more additional users.

* * * * *